(12) United States Patent
Li

(10) Patent No.: US 7,953,072 B2
(45) Date of Patent: May 31, 2011

(54) METHOD AND SYSTEM FOR ENDING-CALL ANCHORING OF CIRCUIT SWITCHED DOMAIN

(75) Inventor: Zhendong Li, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 241 days.

(21) Appl. No.: 12/438,334

(22) PCT Filed: Nov. 30, 2006

(86) PCT No.: PCT/CN2006/003231
§ 371 (c)(1),
(2), (4) Date: Apr. 15, 2009

(87) PCT Pub. No.: WO2008/028353
PCT Pub. Date: Mar. 13, 2008

(65) Prior Publication Data
US 2010/0008353 A1    Jan. 14, 2010

(30) Foreign Application Priority Data
Aug. 23, 2006 (CN) .......................... 2006 1 0112573

(51) Int. Cl.
*H04L 12/28* (2006.01)
(52) U.S. Cl. ........................ 370/352; 370/328; 370/392

(58) Field of Classification Search ........................ None
See application file for complete search history.

(56) References Cited

U.S. PATENT DOCUMENTS

| | | | | |
|---|---|---|---|---|
| 2007/0254625 A1* | 11/2007 | Edge | .......................... | 455/404.1 |
| 2008/0123625 A1* | 5/2008 | Buckley | ........................ | 370/352 |
| 2010/0105379 A1* | 4/2010 | Bonner et al. | ................ | 455/433 |

* cited by examiner

*Primary Examiner* — Duc C Ho
(74) *Attorney, Agent, or Firm* — Trojan Law Offices

(57) ABSTRACT

The present invention discloses a method and a system for call termination anchoring of CS (Circuit Switching) domain, the method including the following steps: when a call coming from CS domain network reaches the mobile switch center in the home circuit switched domain of a voice call continuity subscriber, the mobile switch center sends a LOCREQ message to a home location register to query a location; Step 2, the home location register directly sends a message to the voice call continuity application server to request routing information; and Step 3, the voice call continuity application server returns IP multimedia subsystem routing number information associated with the voice call continuity application server to the home location register to make the call can be anchored to the voice call continuity application server. The present invention realizes call termination anchoring for a VCC subscriber in the circuit domain without intelligent network services.

10 Claims, 3 Drawing Sheets

US 7,953,072 B2

METHOD AND SYSTEM FOR ENDING-CALL ANCHORING OF CIRCUIT SWITCHED DOMAIN

PRIORITY CLAIM

The present application is a U.S. National Stage Application under 35 U.S.C. 371 of PCT/CN2006/003231, filed Nov. 30, 2006, which claims priority to Chinese Patent Application No. 200610112573.9, filed Aug. 23, 2006.

FIELD OF THE INVENTION

The present invention relates to mobile communication technologies, and more particularly, relates to a method and a system thereof for call termination anchoring in circuit domain for a VCC (Voice Call Continuity) user without intelligent network services support during coexistence of an IMS (IP Multimedia Subsystem) network and a circuit domain network.

BACKGROUND OF THE INVENTION

The core network of a mobile communication network is evolving towards IMS of All IP network. However, such the evolution cannot be completed in a short time, and replacement of the current circuit domain network with the IMS will be completed step by step, and this will be a long process. During this process, the coexistence of the IMS and the circuit domain network cannot be avoided.

As for network coverage, some areas may be covered by a single Circuit Switch(CS) network, some areas may be covered by a single IMS network, while some areas may be covered by both of the circuit switch network and the IMS network. With the evolution of the network, the coverage area of the IMS will become broader and broader, and the circuit domain will disappear gradually.

The voice call continuity (VCC) technology is proposed based on the above background. The start point of this technology lies in that an user subscribes both networks and a terminal is a double-mode terminal. When the user initiates a voice session process in one network, the signals of the network decrease, while the other network has fine signals, switching of the networks will occur, for example, the user is switched from the IMS network to the circuit domain network. In this case, the VCC technology is needed to ensure the voice session process will not be interrupted, i.e. ensure the continuity of the session.

The support of an anchoring technology is required in holding the continuity of a voice session process during switching networks. Said anchoring refers to inserting a control point at a session path during a call, and as shown in FIG. 1, the session between the UE (User Equipment) A and the UE B becomes two sessions, i.e. the session between A and the anchoring point C, and the session between the anchoring point C and B, respectively. In this case, if network switching occurs at the terminal A, the session between A and the anchoring point C will be re-established, but the session between the anchoring point C and the terminal B will not be affected or disconnected. In this way, the session between A and B can continue after re-establishing the session between A and the anchoring point C, thereby ensuring the voice session continuity.

In a VCC service, an user subscribes both networks, and each network can allocate a number to the user, for example, the circuit switch network allocates a number of E.164, and the IMS network allocates a SIP URI.

In the prior art, when a call from the circuit domain network reaches the home circuit domain network of the VCC user (the called party number is the one allocated by the circuit switch network), and a method based on an intelligent network or number portability is adopted during an anchoring process. The features of the anchoring process are shown in FIGS. 2 and 3, and for purpose of simplicity, only the process relevant to the background of the present invention will be described hereafter.

FIG. 2 is a call flow of scheme for call termination anchoring in CS domain of an intelligent network, comprising the following steps:

Step 100, the call message ISUP: IAM message of circuit switch network reaches the MSC (Mobile Switching Center) (in general, this MSC is a gateway MSC) of the home circuit domain CS network of a VCC user, and the call message includes a calling party number (CgPN) and a called party number (CdPN);

Step 110, the MSC sends a location query request to a HLR (Home Location Register);

Step 120, the HLR sends a location query request response to the MSC, wherein a trigger list includes the address of a wireless intelligent network signaling control point WIN SCP;

Step 130, the MSC sends an ANLYZD message which includes the called party number to the WIN SCP;

Step 140, the WIN SCP forwards the ANLYZD message to a VCC AS (Voice Call Continuity Application Server) after receiving the message;

Step 150, the VCC application server stores the called party number and established an association between the called party number and a subscriber after receiving the ANLYZD message. A returned anlyzd response message includes a temporary IMS routing number associated with the VCC application server.

Step 160, the WIN SCP forwards the anlyzd message to the MSC;

Step 170, the MSC sends an ISUP call message to the Media Gateway Control Function (MGCF) of the user home network according to the routing information in the anlyzd message;

Step 180, the MGCF initiates a call request (SIP Invite request) to the VCC application server after receiving the call, and this call is completed via an I-CSCF (Interrogating Call Session Control Function); and Step 190, the VCC application server finds the called party number stored in the Step 150 according to the temporary IMS routing number associated with the VCC application server after receiving a call request, and the VCC AS uses a real called party number to continue the call.

FIG. 3 is a call flow of call termination anchoring of CS domain in the number portability scheme, comprising:

Step 210, circuit domain queries number portability database.

Step 220, a response returned by the number portability database includes a LRN (Local Routing Number) which can be used for orientation to the IMS network.

Step 230, the circuit domain sends an IAM message to the MGCF, wherein the called party number is the LRN, and the original called party number is stored in an ISUP Ported Gap information element.

Step 240, upon the MGCF finds that this is number portability, the MGCF extracts the original called party number and sends an Invite message to the I/S-CSCF.

Step 250, the S-CSCF triggers a service to the VCC AS according to an iFC (initial Filter Criteria).

According to the above description, the call termination of the current CS domain can be anchored only when an intelligent network service or number portability is deployed, however, intelligent network service or number portability have not been deployed in many of the current circuit switch network. In this case, the call termination of the CS domain in a VCC service cannot be anchored.

SUMMARY OF THE INVENTION

The object of the present invention is to provide a method for call termination anchoring of circuit switched domain and a system thereof, which can overcome the disadvantages in the prior art that the call termination can not be anchored when the circuit switch network do not deeply intelligent network service or number portability.

In order to achieve the above object, the present invention provides a method for call termination anchoring of circuit switched domain, for the anchoring required by the switching of a circuit switched domain network and an IP multimedia subsystem network, wherein the circuit switched domain network at least includes a mobile switch center and a home location register, and the IP multimedia subsystem network at least includes a voice call continuity application server and a media gateway control function.

The method for call termination anchoring of circuit switched domain according to the embodiments of the present invention comprises the following steps:

Step 1, when a call from a circuit domain network reaches the mobile switch center in the home circuit switched domain of a voice call continuity subscriber, the mobile switch center sends a LOCREQ message to a home location register to query a location;

Step 2, the home location register directly sends a message to the voice call continuity application server to request routing information; and Step 3, the voice call continuity application server returns IP multimedia subsystem routing number information associated with the voice call continuity application server to the home location register to make the call can be anchored to the voice call continuity application server.

Preferably, this method further comprises the following step between the Step 1 and the Step 2:

Step A, the home location register judges whether the anchoring is necessary according to the received LOCREQ message for the voice call continuity subscriber, wherein if the anchoring is necessary, perform the Step 1, while if the anchoring is unnecessary, send the ROUTREQ message to the mobile switch center that serves the user to query routing.

Preferably, the Step 3 further comprises the following steps:

Step 31, after receiving and storing the message for requesting routing information sent by the home location register, the voice call continuity application server returns the IP multimedia subsystem routing number associated with the voice call continuity application server to the home location register, or returns a temporary IP multimedia subsystem routing number that can be routed to the voice call continuity application server to the home location register;

Step 32, after receiving the message returned by the voice call continuity application server, the home location register returns the locreq response message to the mobile switch center, and the routing information in the locreq message is the IP multimedia subsystem routing number associated with the voice call continuity application server; and Step 33, the mobile switch center initiates a call according to the routing information in the locreq message received, and the voice call continuity application server extracts a stored called party number according to a call request information received and continues the call.

Wherein, the Step 33 further comprises the following steps:

Step 33-1, the mobile switch center sends a call message to a media gateway controller according to the message received;

Step 33-2, after receiving the call message, the media gateway controller initiates a call request to the called party number in the message; and Step 33-3, after receiving the call request, the voice call continuity application server extracts the stored called party number and continues initiating the call according to the standard IP multimedia subsystem call flow.

In order to further achieve the object of the present invention, a system for call termination anchoring of a circuit switched domain is also provided, used for the anchoring during switching of a circuit switched domain network and an IP multimedia subsystem network, and the system at least includes a home location register and a voice call continuity application server.

Wherein, the home location register sends a message for requesting routing information to the voice call continuity application server directly; and the voice call continuity application server returns its IP multimedia subsystem routing number information associated with the voice call continuity application server to the home location register to make the call can be anchored to the voice call continuity application server.

Compared with the prior art, the advantage of the present invention lies in that when the mobile switch center MSC queries call termination routing information from the home location register HLR, it can be done directly by HLR requesting the routing information at the VCC application server to realize the anchoring. The present invention solves the technical problem of a call termination in the CS domain can not be anchored when there are no intelligent network or number portability service deployed in the CS domain. Also, this flow of the present invention keeps consistency with the intelligent network mode and only a few changes for network elements are required.

BRIEF DESCRIPTION OF THE DRAWINGS

The figures herein are used to provide further understanding of the present invention and constitute a part of this application, and illustrative examples of the present invention and the description thereof are used to explain the present invention and shall not be construed as improper limitations on the present invention. In the figures.

EMBODIMENT

Figure 1:
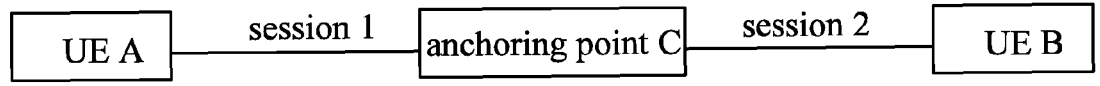
FIG. 1 is a schematic view of anchoring a session according to the prior art.
Figure 2:
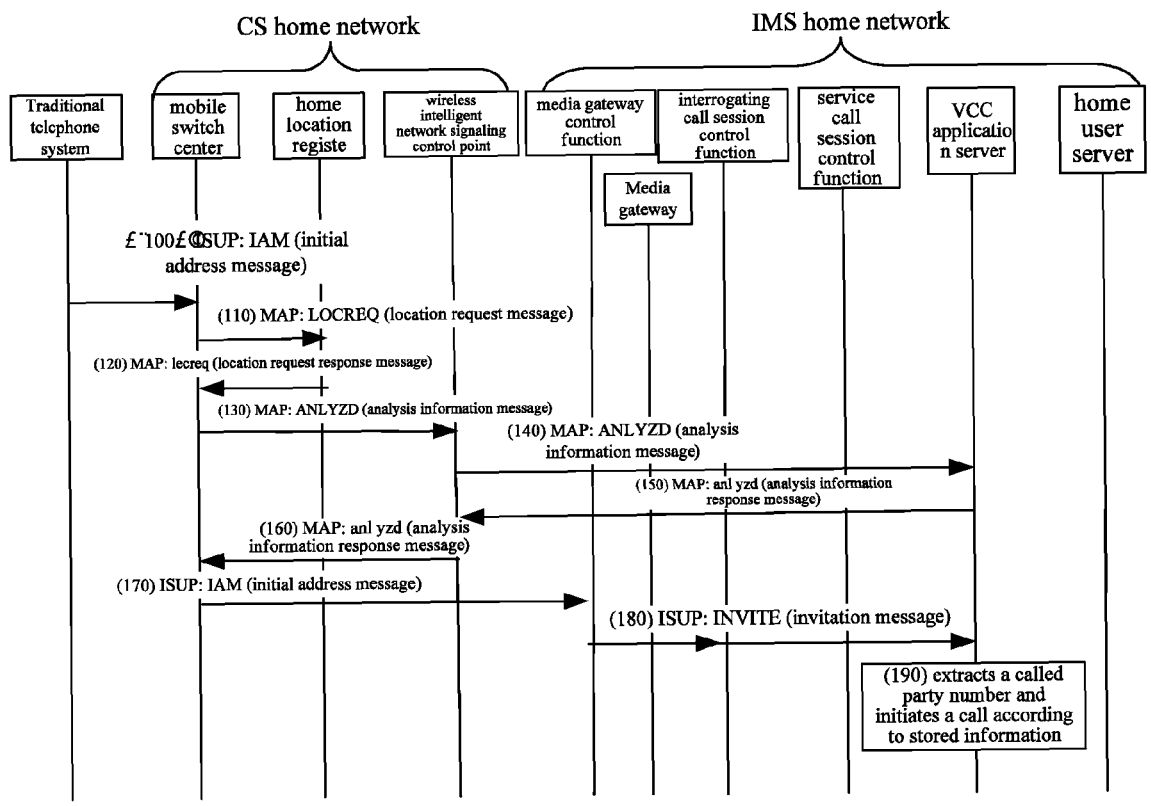
FIG. 2 is a schematic view of call termination anchoring in CS domain according to the intelligent network scheme in the prior art.
Figure 3:
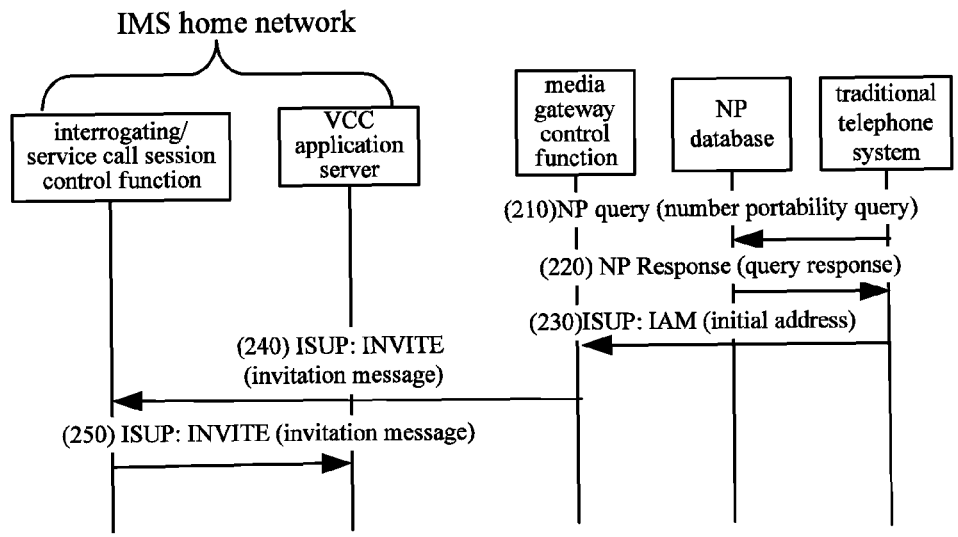
FIG. 3 is a schematic view of call termination anchoring in CS domain according to the number portability scheme in the prior art.

The present invention can be applied to the anchoring during switching of a CS domain network and an IMS network, wherein the CS domain network at least includes a mobile switch center MSC and a home location register HLR, and the IMS network at least includes a VCC application server.

The method for call termination anchoring of CS domain according to the embodiments of the present invention comprises the following steps:

Step 1, when a call of a circuit domain network reaches the MSC of a home CS domain of a VCC subscriber, the MSC sends a LOCREQ message to the HLR; and the LOCREQ at least includes a called party number.

For an user that does not subscribe a VCC service, the HLR performs a normal call termination flow. When the user has subscribed the VCC service, the HLR judges whether an anchoring is necessary according to the LOCREQ message of the VCC subscriber as received, and the HLR queries routing at the VCC AS if the anchoring is necessary; while if the anchoring is unnecessary, the HLR sends a ROUTREQ to the MSC (Visited MSC) that serves the user to query routing; and the judging method comprises but is not limited to the following process:

(1) set a new trigger type, i.e. a VCC trigger, and when the LOCREQ message received by the HLR includes the VCC trigger, it is judged that the anchoring is necessary, while if the LOCREQ message received by the HLR does not include the VCC trigger, it is judged that the anchoring is unnecessary.

(2) the HLR is configured for the VCC subscriber to judge that the anchoring is necessary when the LOCREQ comes from the MSC, and to judge that the anchoring is unnecessary when the LOCREQ comes from the VCC application server.

Step 2, the HLR directly sends a message for requesting routing information to the VCC application server;

Step 3, after receiving the message sent by the HLR, the VCC application server stores relevant information contents and returns the IMS routing number information associated with the VCC application server to the HLR; wherein this step further includes, but not limited to, the following conditions: (a) the message stored by the VCC application server includes a calling party number, a called party number, and the IMS routing number associated with the VCC application server returned to the HLR; (b) the message stored by the VCC application server includes a calling party number, a called party number, and a temporary IMS routing number returned to the HLR that can be routed to the VCC application server; and (c) the message stored by the VCC application server includes a called party number, and a temporary IMS routing number returned to the HLR that can be routed to the VCC application server;

Step 4, after receiving the message returned by the VCC application server, the HLR returns a locreq message to the MSC, and the routing information in the locreq message is the IMS routing number associated with the VCC application server;

Step 5, the MSC sends a call message (ISUP IAM message) to a media gateway controller MGCF according to the message received;

Step 6, after receiving the call message (IAM message), the MGCF sends a SIP INVITE message to the called party number in the message to initiate a call request; and Step 7, after receiving the INVITE call message, in accordance with the relevant message in the Step 3, the VCC application server extracts a received called party number that has been stored and continues initiating the call according to a standard IMS call flow.

Wherein, the received called party number extracted according to the call message in the Step 7 and the relevant message in the Step 3 has but not limited to the following associated conditions: (a) when the VCC application server stores the calling party number and the called party number and returns the IMS routing number associated with the VCC application server in the Step 3, the received called party number is found according to the calling party number in the Step 7; (b) when the VCC application server stores the calling party number and the called party number and then returns a temporary IMS routing number that can be routed to the VCC application server in the Step 3, the received called party number is found according to the calling party number and the temporary IMS routing number in the Step 7; and (c) when the VCC application server stores the called party number and then returns a temporary IMS routing number that can be routed to the VCC application server in the Step 3, the received called party number is found according to the temporary IMS routing number in the Step 7.

The detailed flow of the present invention will be described in detail hereinafter in conjunction with the accompany drawings and the embodiments thereof, and the following description shall not be construed as limitations on the present invention.

The First Embodiment

Figure 4:
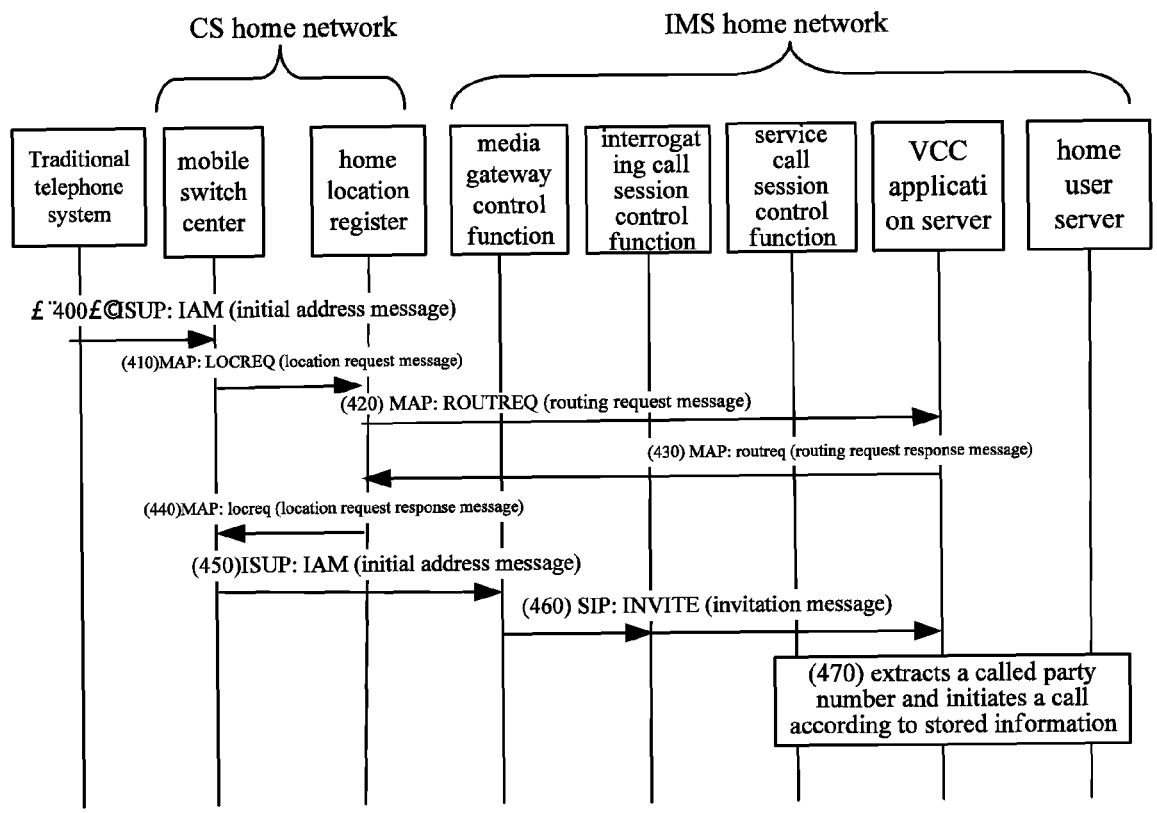
FIG. 4 is a signaling flowchart of realizing anchoring according to example 1 of the present invention, wherein the home location register (HLR) sends a ROUTREQ message to the VCC application server.

FIG. 4 illustrates an example of signaling flow of the present invention, wherein the HLR sends a ROUTREQ message to the VCC, and the steps thereof are as follows:

Step 400, a call from circuit domain reaches the MSC of a home circuit domain of a VCC subscriber, wherein a called party number is a number allocated by the circuit domain;

Step 410, according to the subscription information of the user, the MSC sends to the HLR a location request message LOCREQ which at least includes a called party number;

Step 420, after receiving the LOCREQ message, the HLR sends a ROUTREQ message to the VCC application server according to the content of the message, the subscription information and configuration of the user;

Step 430, after receiving the ROUTREQ message, the VCC application server stores information such as the called party number, and returns to the HLR a routreq response message which includes an IMS routing number (an IMS routing number that can be routed to the VCC application server);

Step 440, after receiving the routreq response message, the HLR returns a locreq response message to the MSC;

Step 450, according to the routing information (an IMS routing number that can be routed to the VCC application server) in the received locreq response message, the MSC initiates an ISUP IAM message to the MGCF of an user IMS home network, wherein a calling party number will not be changed and the called party number is a number received from the locreq;

Step 460, after receiving the IAM message, the MGCF according to the called party number (an IMS routing number that can be routed to the VCC application server) initiates an INVITE message to the VCC application server which reaches the VCC application server via an I-CSCF; and Step 470, after receiving the INVITE message, the VCC application server according to the information therein finds out the received called party number stored in the Step 430, and the VCC application server continues initiating the call according to the received called party number.

The Second Embodiment

Figure 5:
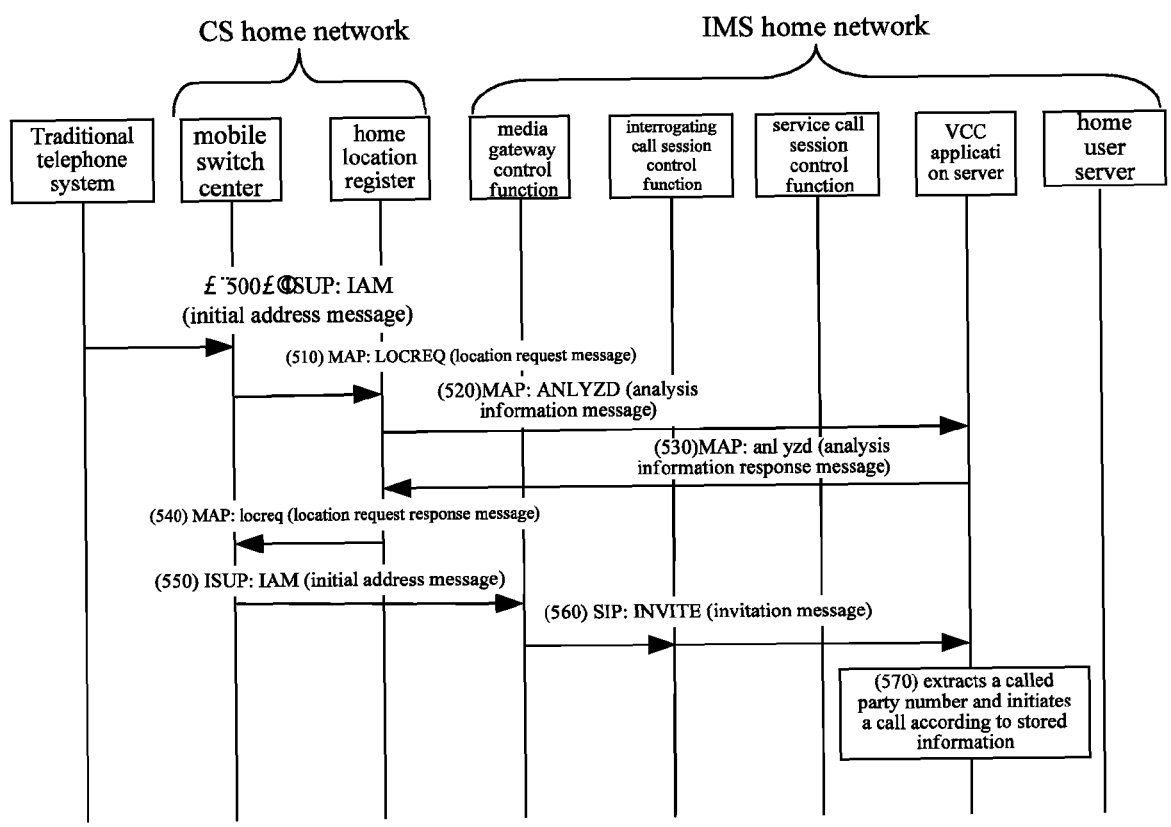
FIG. 5 is a signaling flowchart of realizing anchoring according to example 2 of the present invention, wherein the home location register (HLR) sends an ANLYZD message to the VCC application server.

FIG. 5 illustrates another example of signaling flow of the present invention, wherein the HLR sends an ANLYZD to the VCC, and the steps thereof are as follows:

Step 500, a call from circuit domain reaches the MSC of a home circuit domain of a VCC subscriber, wherein a called party number is a number distributed by the circuit domain;

Step 510, according to the subscription information of the user, the MSC sends to the HLR a location request message LOCREQ which at least includes a called party number;

Step 520, after receiving the LOCREQ message, the HLR sends an ANLYZD message to the VCC application server according to the content of the message, the subscription information and configuration of the user;

Step 530, after receiving the ANLYZD message, the VCC application server stores the called party number, and returns to the HLR an anlyzd response message which includes an IMS routing number (an IMS routing number that can be routed to the VCC application server);

Step 540, after receiving the anlyzd response message, the HLR returns a locreq response message to the MSC;

Step 550, according to the routing information (an IMS routing number that can be routed to the VCC application server) in the received locreq response message, the MSC initiates an ISUP IAM message to the MGCF of an user IMS home network, wherein a calling party number will not be changed and the called party number is a number received from the locreq;

Step 560, after receiving the IAM message, the MGCF according to the called party number (an IMS routing number that can be routed to the VCC application server) initiates an INVITE message to the VCC application server which reaches the VCC application server via an I-CSCF; and Step 570, after receiving the INVITE message, the VCC application server according to the information therein finds out the received called party number stored in the Step 530, and the VCC application server continues initiating the call according to the received called party number.

The system of call termination anchoring of a CS domain according to the present invention is used for the anchoring during switching of a CS domain network and an IMS network, including: a traditional telephone network, a mobile switch center MSC, a home location register HLR, a media gateway control function MGCF, a call session control function CSCF, a voice call continuity application server VCC application server, and a Home Subscriber Server HSS. Main features of this system lie in that the HLR directly sends a message for requesting routing information to the VCC application server in the case of that there are no wireless intelligent network signaling control point WIN SCP; and the VCC application server returns IMS routing number information associated with the voice call continuity application server to the home location register to make the call can be anchored to the voice call continuity application server.

The present invention meets the need of anchoring in the way that the HLR directly requests routing information at the VCC application server. When a call reaches the home CS domain of a VCC subscriber, the HLR directly requests routing information at the VCC application server, and the VCC application server returns its own IMS routing number to make the call can be anchored to the voice call continuity application server.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A method for call termination anchoring of circuit switched domain, used for the anchoring desired by a switching of a circuit switching domain network and an IP multimedia subsystem network, wherein the circuit switched domain network at least includes a mobile switching center and a home location register, and the IP multimedia subsystem network at least includes a voice call continuity application server and a media gateway control function, wherein the method comprises:

Step 1, when a call of a circuit switch domain network reaches the mobile switching center of the home circuit switched domain of a voice call continuity subscriber, the mobile switching center sends a LOCREQ (location request) message to the home location register to query location;

Step 2, the home location register directly sends a message to the voice call continuity application server to request routing information;

Step A performed at the home location register between the Step 1 and the step 2, judges whether the anchoring is necessary; and wherein if it is judged that the anchoring is necessary in the Step A, then perform the Step 2, while if it is judged that the anchoring is unnecessary in the Step A, sends a LOCRES (location request response) message to the mobile switching center that serves the subscriber to query routing; and Step 3, the voice call continuity application server returns IP multimedia subsystem routing number information associated with the voice call continuity application server to the home location register to make the call can be anchored to the voice call continuity application server if the anchoring is necessary.

2. The method for call termination anchoring of circuit switched domain according to claim 1, wherein, the Step 3 further comprises the following steps:

Step B, after receiving and storing the message for requesting routing information sent by the home location register, the voice call continuity application server then returns the IP multimedia subsystem routing number associated with the voice call continuity application server to the home location register, or returns a temporary IP multimedia subsystem routing number that can be routed to the voice call continuity application server to the home location register;

Step C, after receiving the message returned by the voice call continuity application server, the home location register returns a locreq response message to the mobile switching center, and the routing information in the locreq message is the IP multimedia subsystem routing number associated with the voice call continuity application server; and Step D, the mobile switch center initiates a call according to the received routing information in the locreq message, and the voice call continuity application server extracts a stored called party number according to the call request information received and continues the call.

3. The method for call termination anchoring of circuit switched domain according to claim 2, wherein, the Step D further comprises the following steps:

Step D-1, the mobile switching center sends a call message to a media gateway controller according to the message received;

Step D-2, after receiving the call message, the media gateway controller initiates a call request to the called party number in the message; and Step D-3, after receiving the call request, the voice call continuity application server extracts the stored called party number and continues initiating the call according to the standard call flow of the IP multimedia subsystem.

4. The method for call termination anchoring of circuit switched domain according to claim 2, wherein, in the Step B, the message stored by the voice call continuity application server includes a calling party number and a called party number, or only includes the called party number.

5. The method for call termination anchoring of circuit switched domain according to claim 4, wherein,
if the voice call continuity application server stores the calling party number and the called party number and then returns the IP multimedia subsystem routing number associated with the voice call continuity application server in the Step B, the stored called party number is found according to the calling party number in the Step D;
if the voice call continuity application server stores the calling party number and the called party number and then returns a temporary IP multimedia subsystem routing number that can be routed to the voice call continuity application server in the Step B, the received called party number is found according to the calling party number and the temporary IP multimedia subsystem routing number in the Step D; and
if the voice call continuity application server only stores the called party number and then returns a temporary IP multimedia subsystem routing number that can be routed to the voice call continuity application server in the Step B, the received called party number is found according to the temporary IP multimedia subsystem routing number in the Step D.

6. The method for call termination anchoring of circuit switched domain according to claim 1, wherein, in the Step 2, the message directly sent to the voice call continuity application server by the home location register is an ANLYZD message or a ROUTREQ message.

7. The method for call termination anchoring of circuit switched domain according to claim 6, wherein, if the LOCREQ message received by the home location register includes a voice call continuity trigger, it is judged that the anchoring is necessary, and if the LOCREQ message received by the home location register does not include the voice call continuity trigger, it is judged that the anchoring is unnecessary.

8. The method for call termination anchoring of circuit switched domain according to claim 1, wherein, the LOCREQ message at least includes a called party number.

9. The method for call termination anchoring of circuit switched domain according to claim 1, wherein, the type of the message returned by the voice call continuity application server to the home location register in the Step 3 depends on the type of the message that is sent to the voice call continuity application server by the home location register in the Step 2.

10. A system for call termination anchoring of circuit switched domain, used for the anchoring desired by a switching of a circuit switching domain network and an IP multimedia subsystem network, and the system at least includes a home location register and a voice call continuity application server, wherein,
the home location register judges whether the anchoring is necessary according a received LOCREQ (location request) message for a voice call continuity subscriber for directly sending a message for requesting routing information to the voice call continuity application server, and sending a LOCRES (location request response) message to a mobile switching center that serves the subscriber to query routing if the anchoring is unnecessary
the voice call continuity application server returns IP multimedia subsystem routing number information associated with the voice call continuity application server to the home location register to make the call can be anchored to the voice call continuity application server if the anchoring is necessary.

* * * * *